(12) United States Patent
Tebbe

(10) Patent No.: US 6,305,697 B1
(45) Date of Patent: Oct. 23, 2001

(54) CLAMPING JAW DEVICE

(76) Inventor: Joseph John Tebbe, 3682 White Bear Ave., White Bear Lake, MN (US) 55110

( * ) Notice: Subject to any disclaimer, the term of this patent is extended or adjusted under 35 U.S.C. 154(b) by 0 days.

(21) Appl. No.: 09/198,240

(22) Filed: Nov. 23, 1998

(51) Int. Cl.[7] .............. B23B 31/18; B23B 31/30
(52) U.S. Cl. ............ 279/107; 279/4.01; 279/108; 279/123
(58) Field of Search ............... 279/35, 37, 38, 279/123, 106–108, 152, 4.01

(56) References Cited

U.S. PATENT DOCUMENTS

| 445,695 | * | 2/1891 | Grout et al. | 279/108 |
|---|---|---|---|---|
| 791,027 | * | 5/1905 | Heupel | 279/108 |
| 2,708,118 | * | 5/1955 | Kuchenbrod | 279/123 |
| 2,859,042 | * | 11/1958 | Drissner et al. | 279/108 |
| 3,244,430 | * | 4/1966 | Buck | 279/123 |
| 4,211,123 | * | 7/1980 | Mack | 279/4.01 |
| 5,044,421 | * | 9/1991 | Tebbe | 279/107 |

* cited by examiner

Primary Examiner—Steven C. Bishop
(74) Attorney, Agent, or Firm—Herman H Bains

(57) ABSTRACT

A rotary clamping device for use in clamping and holding a metal casting tree during cutting of the metal casting tree includes a cylinder having a piston rod for actuating a plurality of clamping jaws. In one embodiment, a conically shaped cam engages exteriorly disposed clamping jaws for urging the jaws in a clamping direction. In another embodiment, an exteriorly located cam urges the jaws in a clamping direction. The number of jaws employed may vary with the shape of the metal casting tree to be gripped.

8 Claims, 3 Drawing Sheets

CLAMPING JAW DEVICE

FIELD OF THE INVENTION

This invention related to clamps and more particularly to rotary clamps used to hold metal casting trees during a cutting operation.

BACKGROUND OF THE INVENTION

In metal casting operations, several identical articles are simultaneously cast as a cluster or tree. The various articles must be cut from the tree or cluster. In some conventional practices, the cast articles are cut from the tree by a power driven, manually manipulated saw. This type of operation is dangerous and sometimes results in injury to the operator.

SUMMARY OF THE INVENTION

It is an object of this invention to provide an improved rotary clamping device for gripping and holding metal casting trees during a cutting operation regardless of the shape or configuration of the sprue or other part to be gripped.

Another object of this invention is to provide an improved rotary clamping device of elongate configuration for reaching and gripping internally located sprues of metal castings to be cut.

Another object of this invention is to provide a rotary clamping device having recessed clamping jaws for effectively clamping sprues or other parts of metal casting to be cut.

BRIEF DESCRIPTION OF THE FIGURES OF THE DRAWINGS

FIGS. 3–6 are diagrammatic end elevational views illustrating different numbers and arrangements of the clamping jaws for gripping sprues or other parts of metal castings having different shapes;

DESCRIPTION OF THE PREFERRED EMBODIMENT

Figure 1:
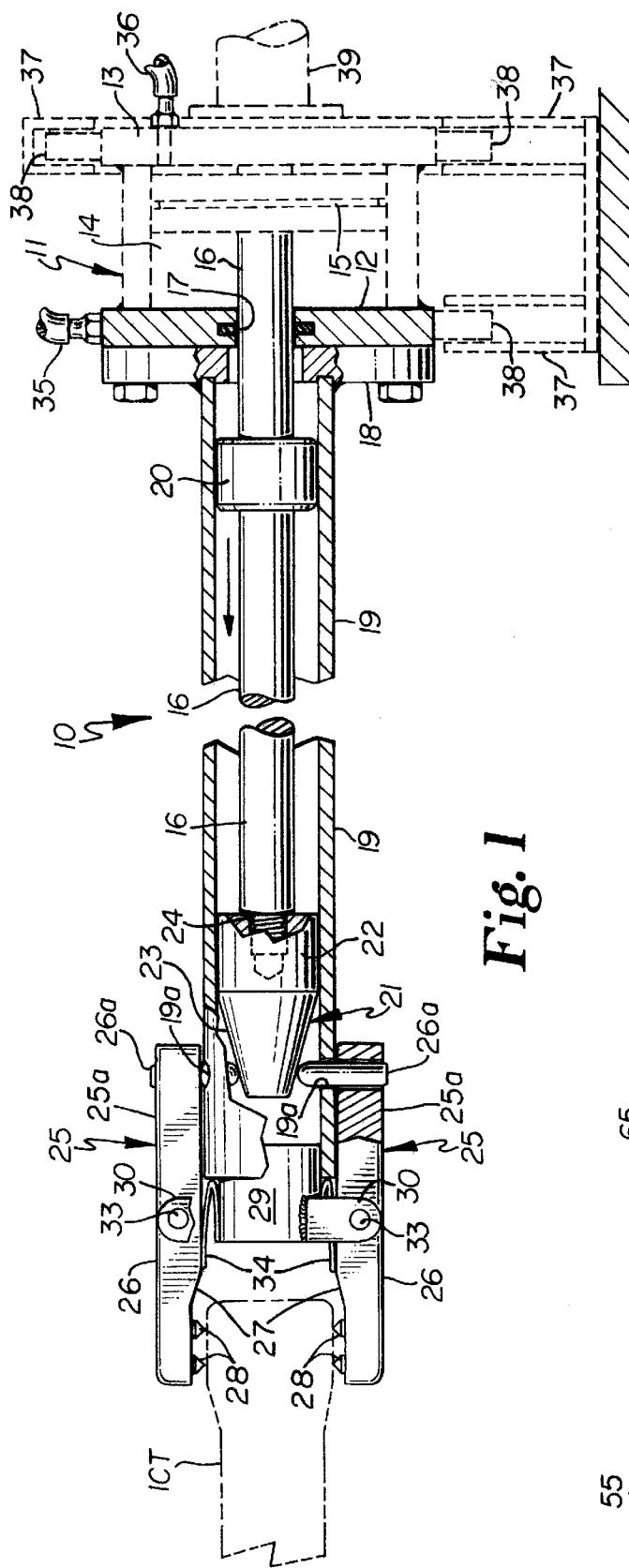
FIG. 1 is a side elevation of one embodiment of my novel rotary clamping device illustrated in clamping relation with a metal casting depicted in dotted line configuration and with parts thereof broken away for clarity.
Figure 2:
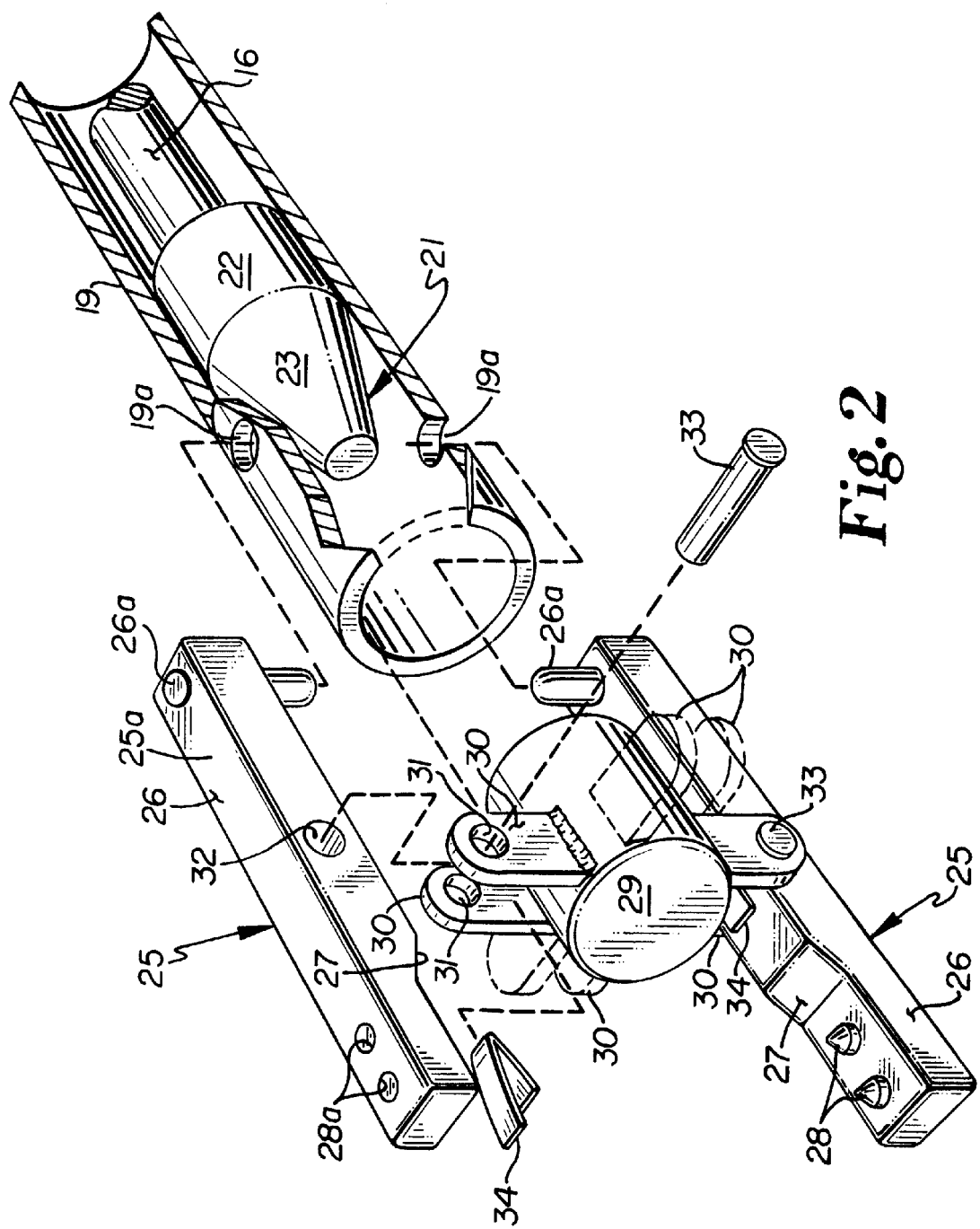
FIG. 2 is an exploded, fragmentary perspective view of a portion of the clamping device illustrated in FIG. 1 with certain parts thereof broken for clarity.

Referring now to FIGS. 1–6, it will be seen that one embodiment of the novel clamping device, designated generally by the reference numeral 10, is thereshown. The clamping device 10 is a rotary clamping device and is intended to be used in conjunction with the apparatus for holding and cutting metal casting trees disclosed in my co-pending application entitled Apparatus For Clamping and Precisely Cutting Metal Castings, filed Nov. 2, 1998, Ser. No. 09/184,150. The rotary clamping device 10 is rotatable about its longitudinal axis to position the metal casting ICT in the optimum condition for cutting. It will be noted that the sprue of the metal casting ICT is gripped and held by the rotary clamping device 10.

The rotary clamping device 10 includes a cylinder 11 having a rear plate 13 and a front plate 12 which co-operates with the cylinder to define a chamber 14. A piston 15 is positioned in the chamber and is movable axially therein in response to hydraulic fluid introduced into the chamber. One end of an elongate piston rod 16 is secured to the piston and projects axially through the plate 12 as best seen in FIG. 1. In this regard, the plate 12 is provided with an opening 17 through which the piston rod 16 projects and a suitable O-ring seal sealingly engages the piston rod 16.

A plate 18 is secured to the plate 12 and has one end of an elongate tube 19 welded thereto. It will be noted that the plate 18 has an opening therein through which the piston rod 16 projects.

The piston rod 16 has a collar 20 secured thereto intermediate the ends thereof but located adjacent the rear end portion of the piston rod. The tube 19 serves as a guide tube and the collar 20 is movable in the tube along with the piston 16. The collar 20 serves to stabilize the movement of the piston rod during movement thereof in the tube 19.

The outer or front end of the piston rod 16 has a cam 21 secured thereto and projecting therefrom. The cam 21 includes a cylindrical portion 22 which engages the inner surface of the guide tube 19. The cam also includes a frusto conical portion 23 which is integral with the cylindrical portion 22 and tapers forwardly therefrom. The piston rod 16 has a threaded forward end 24 which threadedly engages in a threaded recess in the cam 21 for securing the cam to the piston rod. It will be seen that the piston rod 16 and cam 21 are movable in an advanced direction, to the left as viewed in FIG. 1, and a retracted direction, to the right as viewed in FIG. 1.

The clamping jaw assembly 25 is secured to the outer end portion of the guide tube 19 and includes a plurality of clamping jaws 25a. Each clamping jaw 25a includes an elongate rectangular jaw body 26 having a recessed clamping face 27. In the embodiment shown, each clamping jaw 25a is provided with a pair of clamping teeth 28 which project through openings 28a in the clamping jaw body. The clamping teeth 28 project inwardly beyond the clamping face 27 as best seen FIGS. 1 and 2. In the embodiments of FIGS. 1–4 and 6, the teeth of each clamping jaw are arranged in a fore and aft spaced relation with respect to each other.

A cylindrical jaw mounting member 29 is mounted within the outer end of the guide tube 19 and projects therefrom. The cylindrical mounting member 29 has a plurality of pairs of ears 30 secured thereto and projecting therefrom as best in FIG. 2. That portion of the jaw mounting member 29 to which the ears are secured is located forwardly of the guide tube 19. The ears 30 are provided with openings or apertures 31 for accommodating pivot pins 33 which extend through openings 32 in the jaw members. In the embodiment illustrated in FIGS. 1 and 2, a pair of clamping jaws 25a are pivotally secured to the mounting member 29 in opposed relation with respect to each other. The jaws are pivoted in release and clamping directions. A spring 34 is provided for each jaw 25a and is interposed between jaw mounting member 29 and one of the jaws 25a to normally urge the jaw in an open or release direction.

Referring again to FIGS. 1 and 2, it will be seen that the rear end portion of each jaw 25a has a cam follower pin 26a press fitted in the jaw and projecting inwardly therefrom. These cam follower pins 26a pass through openings 19a in the guide tube 19 and are disposed in engaging relation with the frusto conical portion 23 of the cam 21. It will be seen that when the piston and piston rod are moved in an advanced direction, the cam 21 will progressively cam the rear end portion of the jaws 25a outwardly which causes the front portion of the jaws to be progressively moved in a clamping direction.

It will be appreciated that the piston rod 16 will remain in the advanced condition when the clamping jaws 25a are clamping the sprue or other part of a casting tree. When the piston rod 16 is retracted, the flat springs 34 urge the jaws to the normally open position. It will again be noted that the springs 34 are interposed between the cylindrical mounting member 29 and the inner surface of the associated jaw 25a.

A pair of conduits 35 and 36 are connected in communicating relation with the cylindrical chamber 14 for supplying hydraulic fluid thereto. These conduits 35, 36 are connected to a source of hydraulic fluid under pressure for selectively shifting the piston 15 axially of the chamber 14 in opposite directions.

The end plates 12 and 13 of the cylinder 11 are provided with bearing engaging elements 38 which engage in bearings 37 to permit rotation of the entire clamping device when the rod 39 is rotated. It is pointed out that the rod 39 is rigidly connected to the end plate 13 as best seen in FIG. 1.

Referring now to FIG. 3, it will be seen that the rotary clamp device 10 is diagrammatically depicted with a jaw assembly 55 having four clamping jaws 56 for clamping a metal casting tree ICT. It will be noted that the jaws 56 are symmetrically arranged and are angularly disposed approximately 90° apart. Each jaw 56 is provided with a pair of teeth 58 which are arranged in fore and aft aligned relation.

Referring now to FIG. 4, it will be seen that the rotary clamping device is illustrated diagrammatically and is provided with a jaw assembly 65 having three symmetrically arranged jaws 66 for clamping the metal casting tree ICT. It will be noted that the jaws 66 are arranged approximately 120° apart. Each jaw 66 is provided with a pair of gripping teeth 68 which are arranged in fore and aft aligned relation.

Referring now to FIG. 5, it will be seen that the rotary clamping device is provided with a jaw assembly 75 having a pair of opposed jaws 76 for clamping and holding the metal casting tree ICT. In the embodiment of FIG. 5, each clamping jaw is provided with a pair of teeth 78 which are disposed in side-by-side spaced relation rather than the fore and aft relation of the embodiments of FIGS. 1–4.

Referring now to FIG. 6, it will be seen that the rotary clamping device is diagrammatically illustrated having a jaw assembly 85 which is comprised of three jaws 86. The jaws 86 are not symmetrically arranged but serve to clamp a metal casting tree ICT. It will be noted that each jaw 86 is provided with a pair of clamping teeth 88 which are disposed in fore and aft relation.

From the foregoing description of the rotary clamping device 10 depicted in the embodiments FIGS. 1–6, it should be clear that the number of jaws and their particular arrangement may be selectively determined based on the configuration of the sprue or other part of the metal casting tree to be gripped. The gripping teeth may be arranged in fore and aft relation or may be disposed in side-by-side relation, again, depending on the shape of the sprue or part of the metal casting tree to be gripped. It will be appreciated that the number of jaws to be used is limited only by the space constraints of the size of the jaws and the mounting member 29. The linear dimension of the clamping jaw device 10 is substantially greater than the conventional clamping jaw device. This long reach makes this clamping device especially adapted for gripping the interior part or sprue of a metal casting tree.

Referring now to FIGS. 7–10, it will be seen that a different embodiment of the rotary clamping device, designated generally by the reference numeral 100, is thereshown. The rotary clamping device is similar in construction and operation to the rotary clamping device disclosed in U.S. Pat. No. 5,044,421 which is used in a cleaning rather than a cutting operation. The rotary clamp device 100 includes a clamp body 101 including a rear circular plate 102, an intermediate circular plate 103 and a circular camming ring 104. The clamp body also includes a rear cylindrical portion 105 and a front cylindrical body portion 106. It will be seen that the rear body portion 105 is secured to the rear circular plate 102 and the intermediate circular plate 103. The front cylindrical body portion 106 is secured to the intermediate circular plate 103 and the clamping ring 104.

A pipe 107 is welded to an annular plate 108 which is secured by bolts 109 to the rear circular plate 102. The pipe is connected to a wheel which permits the entire rotary clamp device 100 to be rotated about its longitudinal axis.

A piston 112 is positioned in the chamber 111 of the rear cylindrical body portion 105. The piston 112 is moveable axially in the chamber 111 in response to fluid pressure. The piston 112 is provided with O-ring seals for engaging the interior surface of the cylindrical chamber 111 and one end of an elongate piston rod 114 is secured to the piston 112. In this regard, the piston rod 114 has its rear end threaded as at 115 which projects through an opening in the piston rod and is secured thereto by nut 116. It will be seen that when the piston 112 is moved axially of the chamber 111, the piston rod 114 moves with the piston as a unit.

The piston rod 114 projects through the intermediate plate 103 which has O-ring seals 117 for providing a fluid type seal therebetween. A flange 118 having a reduced forward end is secured to the intermediate plate 103 by means of bolts 119. An O-ring seal 120 is provided between the reduced end of the flange 118 and the piston rod 114.

Figure 7:
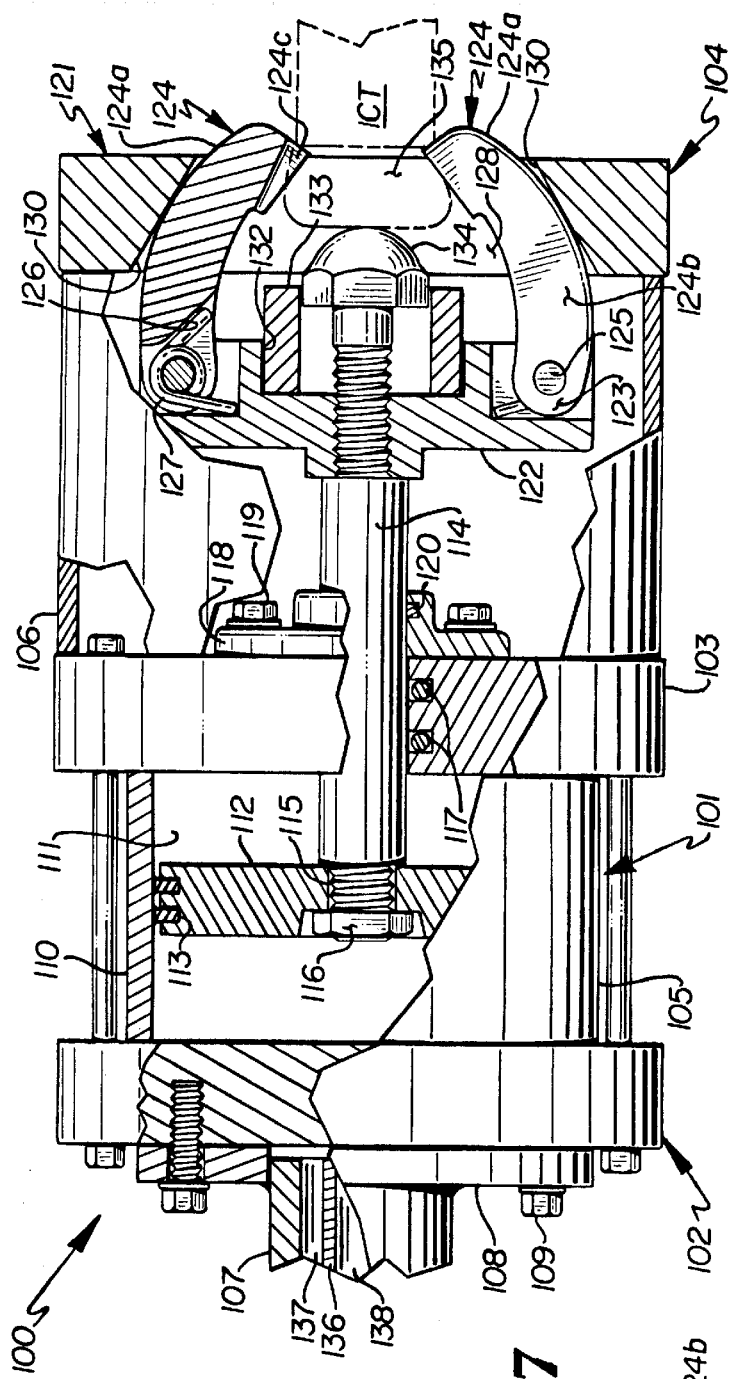
FIG. 7 is a side elevational view of a different embodiment of the rotary clamping device with certain parts thereof broken away for clarity.

The outer end of the piston rod 114 is secured to a clamp assembly 121. The clamp assembly 121 includes a clamp retainer plate 122 which is integral with the piston rod 114. The clamp retainer plate 122 has diametrically disposed recesses 123 therein, each accommodating one end portion of an arcuate clamp jaw 124. Each clamping jaw 124 is pivotally connected to the retainer plate 122 by a pivot 125 which permit the clamping jaws 124 to be moved in clamping and release directions. Each clamping jaw 124 is urged in a release direction by a spring 126 as best seen in FIG. 7.

In the embodiment shown, it will be seen that each clamping jaw 124 has an outer curved surface 124a, substantially flat side surfaces 124b and a notch 124c formed in the front portion of the inner surface of the clamping jaw. The curved outer surface 124a actually defines a cam follower surface.

It will be noted that the rear end portion of each jaw 124 has a recess 127 therein for accommodating the spring 126. It will further be noted that the cam ring 104 has an inner forwardly and inwardly tapered surface 128 which is generally of frustro conical configuration. The inner surface of the cam ring 104 has a pair of diametrically opposed notches 129 therein, each notch including a camming notch surface 130 and substantially flat side surfaces 131. Each clamping jaw 124 is positioned in one of the notches 129 so that the outer cam follower surface 124 of the jaw is in engaging relation with the camming notch surface 130.

The clamp retainer plate 122 has a centrally located recess 132 therein for accommodating a generally cylindrical seal 133. An abutment bolt 134 is threaded into a threaded recess in the central portion of the clamp retainer plate and is provided with a bolt head 135 having an outer convex surface.

It will be seen that the pipe 107 which is welded to the annular plate 108 has a smaller pipe 136 positioned concentrically therein to define an annular passage 137 and a central passage 138 through which hydraulic fluid under pressure is supplied to the chamber 111 for shifting the piston 112 in advanced and retracted positions.

It will be seen that when the piston rod 114 is advanced, the clamping jaws 124 will be moved forwardly and urged in a clamping direction for progressively engaging the metal casting tree ICT. The sprue or other part of the metal casting tree will be gripped by the notched face of the jaws and held firmly during the cutting operation. The clamping jaws will be restrained against movement by the interaction of the jaws with the associated notches 129. It is pointed out that during the cutting operation of the metal casting tree ICT, the jaws will be subjected to torque and side loading but are restrained against movement by the coaction of the arcuate jaws in the notches 129. The notches 124c and the jaws 124 provide a highly efficient gripping surface for gripping the sprue or other part of the metal casting tree.

It will be appreciated that the cross-sectional configuration of the jaws 124 and the cross-sectional configuration of the notches 129 can have other shapes and are not limited to the configurations shown. For example, the notches may be arcuate or curved in cross-section and the jaws may also be arcuate and curved in cross-section.

Figure 10:
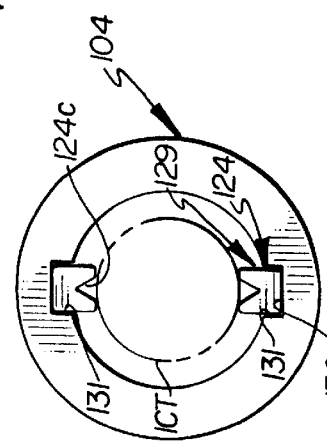
FIGS. 8–10 are end elevational views of the clamping jaws and camming ring illustrating how differently shaped sprues are effectively gripped, FIG. 8 being depicted in broken exploded condition for clarity.
Figure 9:
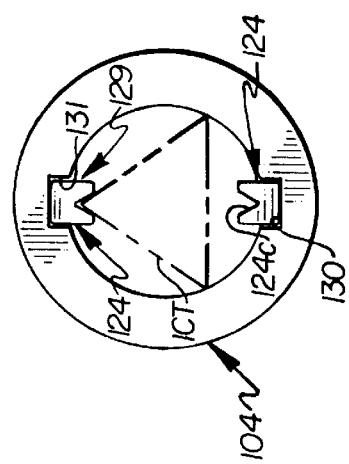
Figure 8:
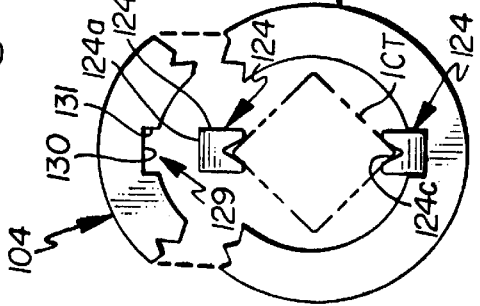

Referring now to FIGS. 8, 9 and 10, it will be seen that different shaped sprues or metal casting parts to be gripped are illustrated in gripped relation by the jaws 124. In FIG. 8, a sprue or other part of the metal casting tree having a generally square or diamond shape configuration is shown being gripped at opposed corners. In FIG. 9, a sprue or other part of the metal casting having a triangular cross-sectional shape is gripped by the rotary clamping device. In FIG. 9, an apex of the triangular shaped sprue is gripped by a jaw while the other two apices are clamped against the inner surface 130 of the cam ring 104.

In FIG. 10, a sprue or other part of the metal casting tree ICT having a circular cross-sectional configuration is illustrated in gripped relation by the jaws 124. It is pointed out that the configuration of the notch 124c may also have other configurations than the V-shaped notch illustrated in the embodiments of FIGS. 7, 8 and 9. Thus the notch 124c may be circular, square or the gripping face of the jaws 124 may be only slightly concave. The notch or concavity in the jaw face may have any number of configurations.

From the foregoing, it will be seen that the two embodiments of the rotary clamping devices are constructed to effectively grip variously configured sprues and other parts of metal casting trees to be gripped during a cutting operation. The rotary clamping devices positively hold the gripped metal casting tree against torque and side loading to assure effective and precise cutting of the casting tree.

Thus it will be seen that I have provided a rotary clamping device which is arranged and constructed for highly efficient action during a cutting operation of a metal casting tree.

What is claimed is:

1. A rotary clamping device for use in clamping and holding a metal casting tree during cutting of the metal casting tree, comprising a cylinder, an elongate piston rod in said cylinder projecting axially from the cylinder and having inner and outer ends, a piston secured to said piston rod and positioned with the cylinder, means connecting the cylinder to a source of fluid under pressure for shifting the piston and piston rod axially of the cylinder in advanced and retracted directions, an elongate guide secured to said cylinder and projecting axially therefrom, said guide having inner and outer ends, said piston rod positioned interiorly of the guide, a plurality of elongate jaws positioned exteriorly of the guide, means pivotally connecting each jaw with the guide for pivoting movement of the each jaw about an axis between open and closed positions, the pivotal axis for each jaw located exteriorly of the guide, means engaging said jaws for normally urging the jaws to the open position, cam means on the piston rod engaging said jaws for camming the jaws to a closed position when said piston rod is advanced.

2. The rotary clamping device as defined in claim 1 wherein each jaw is provided with a cam follower which projects inwardly therefrom into engaging relation with said cam.

3. The rotary clamping device as defined in claim 1 wherein at least three jaws are pivotally mounted on said guide.

4. The rotary clamping device as defined in claim 1 wherein said cam means comprises a frusto-conical cam element.

5. The rotary clamping device as defined in claim 1 wherein said guide is of cylindrical configuration.

6. The rotary clamping device as defined in claim 1 wherein said jaws are of generally rectangular configuration having substantially flat clamping faces, and each jaw having a plurality of clamping teeth secured to the clamping face and extending therefrom.

7. A rotary clamping device for use in clamping and holding a metal casting tree during cutting of the metal casting tree, comprising, a cylinder, a piston rod in said cylinder and projecting axially from the cylinder, a piston secured to the piston rod and positioned in said cylinder, means connecting the cylinder to a source of fluid under pressure for shifting the piston and piston rod axially in advanced and retracted directions, a pair of elongated similar clamping jaws, means pivotally connecting the jaws to the outer end of the piston rod for pivoting movement of the jaws towards each other in a clamping directions, and away from each other in a release direction, each jaw having a curved outer surface, flat opposed side surfaces, and a curved inner surface, means engaging and normally urging the jaws in a release direction, an adjustable abutment member secured to the piston rod and projecting therefrom between the jaws, a camming ring secured to the cylinder engaging and positioned exteriorly of the jaws, said camming ring having a forwardly tapered inner surface, said camming ring having a pair of opposed, slots in the inner surface thereof, each slot defining opposed side surfaces and a camming surface engaging the side and curved exterior surfaces of a jaw whereby when the piston rod is extended the sprue or other part of a metal casting tree will be clamped by at least one jaw and securely held against lateral displacement and twisting due to side loading and torque forces extended on the metal casting during the cutting operation, each jaw having an outer and, said interior surface of each jaw having a recess therein to define a pair of laterally aligned teeth whereby sprues or other parts of a metal casting to be gripped will protect into the jaw recesses.

8. The rotary cam as defined in claim 7 wherein the recess in each jaw is of generally V-shaped configuration.

* * * * *